US006857281B2

(12) United States Patent
Wightman

(10) Patent No.: US 6,857,281 B2
(45) Date of Patent: Feb. 22, 2005

(54) EXPANSION DEVICE FOR VAPOR COMPRESSION SYSTEM

(75) Inventor: David A. Wightman, Prospect Heights, IL (US)

(73) Assignee: XDX, LLC, Arlington Heights, IL (US)

(*) Notice: Subject to any disclaimer, the term of this patent is extended or adjusted under 35 U.S.C. 154(b) by 437 days.

(21) Appl. No.: 09/809,798

(22) Filed: Mar. 16, 2001

(65) Prior Publication Data
US 2002/0029577 A1 Mar. 14, 2002

Related U.S. Application Data

(63) Continuation-in-part of application No. 09/661,477, filed on Sep. 14, 2000.

(51) Int. Cl.[7] .............................................. F25B 41/04
(52) U.S. Cl. ..................... 62/222; 236/92 B; 236/93 R; 251/205
(58) Field of Search .......................... 62/222, 223, 224, 62/225; 236/92 B, 92 R, 93 R; 251/205, 326, 328

(56) References Cited

U.S. PATENT DOCUMENTS

| 1,017,292 A | 2/1912 | Hyde |
| 1,907,885 A | 5/1933 | Shively |
| 2,084,755 A | 6/1937 | Young, Jr. |
| 2,112,039 A | 3/1938 | McLenegan |
| 2,126,364 A | 8/1938 | Witzel |
| 2,164,761 A | 7/1939 | Ashley |
| 2,200,118 A | 5/1940 | Miller |
| 2,229,940 A | 1/1941 | Spofford |
| 2,323,408 A | 7/1943 | Miller |
| 2,467,519 A | 4/1949 | Borghesan |
| 2,471,448 A | 5/1949 | Platon |
| 2,511,565 A | 6/1950 | Carter |
| 2,520,191 A | 8/1950 | Aughey et al. |
| 2,539,062 A | 1/1951 | Dillman |
| 2,547,070 A | 4/1951 | Aughey et al. |
| 2,571,625 A | 10/1951 | Seldon |
| 2,596,036 A | 5/1952 | MacDougall |
| 2,707,868 A | 5/1955 | Goodman |
| 2,755,025 A | 7/1956 | Boles |
| 2,771,092 A | 11/1956 | Schenk |

(List continued on next page.)

FOREIGN PATENT DOCUMENTS

| BE | 773764 | 1/1972 |
| DE | 197 52 259 A1 | 6/1998 |
| DE | 197 43 734 A1 | 4/1999 |

(List continued on next page.)

OTHER PUBLICATIONS

03304466; Hiroshi et al.; Air Conditioner; Nov. 15, 1990; Pub. No. 02–279968; p. 156.

(List continued on next page.)

Primary Examiner—Fadi H. Dahbour
(74) Attorney, Agent, or Firm—Brinks Hofer Gilson & Lione; Gregory H. Zayia

(57) ABSTRACT

A vapor compression system having a line for flowing heat transfer fluid, a compressor and a condenser both connected with the line. The vapor compression system also has an expansion device connected with the line for expanding the heat transfer fluid. The expansion device has a housing defining a housing orifice and at least one ball within the housing. The ball forms at least two channels, wherein each channel defines a channel orifice. The effective cross-sectional area of the one channel orifice is greater than the effective cross-sectional area of the other channel orifice. Moreover, the ball is movable between a first position and a second position, wherein the housing orifice is effectively made larger in the first position than in the second position. The vapor compression system also has an evaporator connected with the line for transferring heat from ambient surroundings to the heat transfer fluid.

37 Claims, 9 Drawing Sheets

| Patent No. | | Date | Inventor |
|---|---|---|---|
| 2,856,759 | A | 10/1958 | Barbulesco |
| 2,922,292 | A | 1/1960 | Lange |
| 2,944,411 | A | 7/1960 | McGrath |
| 2,960,845 | A | 11/1960 | Lange |
| 3,007,681 | A | 11/1961 | Keller |
| 3,014,351 | A | 12/1961 | Leimbach |
| 3,060,699 | A | 10/1962 | Tilney |
| 3,115,896 | A | 12/1963 | Roberts et al. |
| 3,138,007 | A | 6/1964 | Friedman et al. |
| 3,150,498 | A | 9/1964 | Blake |
| 3,194,499 | A | 7/1965 | Noakes et al. |
| 3,257,822 | A | 6/1966 | Abbott |
| 3,316,731 | A | 5/1967 | Quick |
| 3,343,375 | A | 9/1967 | Quick |
| 3,392,542 | A | 7/1968 | Nussbaum |
| 3,402,566 | A | 9/1968 | Leimbach |
| 3,427,819 | A | 2/1969 | Seghetti |
| 3,464,226 | A | 9/1969 | Kramer |
| 3,520,147 | A | 7/1970 | Glackman |
| 3,631,686 | A | 1/1972 | Kautz |
| 3,633,378 | A | 1/1972 | Toth |
| 3,638,444 | A | 2/1972 | Lindahl |
| 3,638,447 | A | 2/1972 | Abe |
| 3,683,637 | A | 8/1972 | Oshima et al. |
| 3,696,628 | A | 10/1972 | Coyle, Sr. |
| 3,698,204 | A | 10/1972 | Schlotterbeck et al. |
| 3,708,998 | A | 1/1973 | Scherer et al. |
| 3,727,423 | A | 4/1973 | Nielson |
| 3,785,163 | A | 1/1974 | Wagner |
| 3,792,594 | A | 2/1974 | Kramer |
| 3,798,920 | A | 3/1974 | Morgan |
| 3,812,882 | A | 5/1974 | Taylor |
| 3,822,562 | A | 7/1974 | Crosby |
| 3,866,427 | A | 2/1975 | Rothmayer et al. |
| 3,921,413 | A | 11/1975 | Kohlbeck |
| 3,934,424 | A | 1/1976 | Goldsberry |
| 3,934,426 | A | 1/1976 | Jespersen et al. |
| 3,948,060 | A | 4/1976 | Gaspard |
| 3,965,693 | A | 6/1976 | Widdowson |
| 3,967,466 | A | 7/1976 | Edwards |
| 3,967,782 | A | 7/1976 | Eschbaugh et al. |
| 3,968,660 | A | 7/1976 | Amann et al. |
| 3,980,129 | A | 9/1976 | Bergdahl |
| 4,003,729 | A | 1/1977 | McGrath |
| 4,003,798 | A | 1/1977 | McCord |
| 4,006,601 | A | 2/1977 | Ballarin et al. |
| 4,103,508 | A | 8/1978 | Apple |
| 4,106,691 | A | 8/1978 | Nielsen |
| 4,122,686 | A | 10/1978 | Lindahl et al. |
| 4,122,688 | A | 10/1978 | Mochizuki et al. |
| 4,136,528 | A | 1/1979 | Vogel et al. |
| 4,151,722 | A | 5/1979 | Willitts et al. |
| 4,159,078 | A * | 6/1979 | Diermayer et al. ....... 236/93 R |
| 4,163,373 | A | 8/1979 | van der Sluijs |
| 4,167,102 | A | 9/1979 | Willitts |
| 4,176,525 | A | 12/1979 | Tucker et al. |
| 4,182,133 | A | 1/1980 | Haas et al. |
| 4,184,341 | A | 1/1980 | Friedman |
| 4,191,326 | A * | 3/1980 | Diermayer et al. ....... 236/93 R |
| 4,193,270 | A | 3/1980 | Scott |
| 4,207,749 | A | 6/1980 | Lavigne, Jr. |
| 4,230,470 | A | 10/1980 | Matsuda et al. |
| 4,235,079 | A | 11/1980 | Masser |
| 4,245,778 | A * | 1/1981 | Diermayer ................ 236/93 R |
| 4,270,362 | A | 6/1981 | Lancia et al. |
| 4,285,205 | A | 8/1981 | Martin et al. |
| 4,290,480 | A | 9/1981 | Sulkowski |
| 4,302,945 | A | 12/1981 | Bell |
| 4,311,020 | A | 1/1982 | Tobin et al. |
| 4,328,682 | A | 5/1982 | Vana |
| 4,337,892 | A * | 7/1982 | Diermayer et al. ....... 236/93 R |
| 4,350,021 | A | 9/1982 | Lundstrom |
| 4,398,396 | A | 8/1983 | Schmerzler |
| 4,430,866 | A | 2/1984 | Willitts |
| 4,451,273 | A | 5/1984 | Cheng et al. |
| 4,485,642 | A | 12/1984 | Karns |
| 4,493,364 | A | 1/1985 | Macriss et al. |
| 4,543,802 | A | 10/1985 | Ingelmann et al. |
| 4,554,948 | A | 11/1985 | Bergmann |
| 4,583,582 | A | 4/1986 | Grossman |
| 4,596,123 | A | 6/1986 | Cooperman |
| 4,606,198 | A | 8/1986 | Latshaw et al. |
| 4,612,783 | A | 9/1986 | Mertz |
| 4,621,505 | A | 11/1986 | Ares et al. |
| 4,633,681 | A | 1/1987 | Webber |
| 4,658,596 | A | 4/1987 | Kuwahara |
| 4,660,385 | A | 4/1987 | Macriss et al. |
| 4,742,694 | A | 5/1988 | Yamanaka et al. |
| 4,779,425 | A | 10/1988 | Sasaki et al. |
| 4,798,365 | A * | 1/1989 | Mayhew ..................... 251/205 |
| 4,813,474 | A | 3/1989 | Umezu |
| 4,848,100 | A | 7/1989 | Barthel et al. |
| 4,852,364 | A | 8/1989 | Seener et al. |
| 4,854,130 | A | 8/1989 | Naruse et al. |
| 4,881,718 | A | 11/1989 | Champagne |
| 4,888,957 | A | 12/1989 | Chmielewski |
| 4,909,277 | A | 3/1990 | Vandiver |
| 4,938,032 | A | 7/1990 | Mudford |
| 4,942,740 | A | 7/1990 | Shaw et al. |
| 4,947,655 | A | 8/1990 | Shaw |
| 4,955,205 | A | 9/1990 | Wilkinson |
| 4,955,207 | A | 9/1990 | Mink |
| 4,979,372 | A | 12/1990 | Tanaka |
| 4,984,433 | A | 1/1991 | Worthington |
| 5,011,112 | A | 4/1991 | Glamm |
| 5,044,551 | A * | 9/1991 | Tanaka et al. ............ 236/92 B |
| 5,050,393 | A | 9/1991 | Bryant |
| 5,058,388 | A | 10/1991 | Shaw et al. |
| 5,062,276 | A | 11/1991 | Dudley |
| 5,065,591 | A | 11/1991 | Shaw |
| 5,070,707 | A | 12/1991 | Ni |
| 5,072,597 | A | 12/1991 | Bromley et al. |
| 5,076,068 | A | 12/1991 | Mikhail |
| 5,094,598 | A | 3/1992 | Amata et al. |
| 5,107,906 | A | 4/1992 | Swenson et al. |
| 5,129,234 | A | 7/1992 | Alford |
| 5,131,237 | A | 7/1992 | Valbjorn |
| 5,168,715 | A | 12/1992 | Nakao et al. |
| 5,181,552 | A | 1/1993 | Eiermann |
| 5,195,331 | A | 3/1993 | Zimmerman et al. |
| 5,231,845 | A | 8/1993 | Sumitani et al. |
| 5,249,433 | A | 10/1993 | Hardison et al. |
| 5,251,459 | A | 10/1993 | Grass et al. |
| 5,253,482 | A | 10/1993 | Murway |
| 5,291,941 | A | 3/1994 | Enomoto et al. |
| 5,303,561 | A | 4/1994 | Bahel et al. |
| 5,305,610 | A | 4/1994 | Bennett et al. |
| 5,309,725 | A | 5/1994 | Cayce |
| 5,329,781 | A | 7/1994 | Farrey et al. |
| 5,355,323 | A | 10/1994 | Bae |
| 5,377,498 | A | 1/1995 | Cur et al. |
| 5,408,835 | A | 4/1995 | Anderson |
| 5,417,083 | A | 5/1995 | Eber |
| 5,423,480 | A | 6/1995 | Heffner et al. |
| 5,440,894 | A | 8/1995 | Schaeffer et al. |
| 5,509,272 | A | 4/1996 | Hyde |
| 5,515,695 | A | 5/1996 | Sakakibara et al. |
| 5,520,004 | A | 5/1996 | Jones, III |
| 5,544,809 | A | 8/1996 | Keating et al. |
| 5,546,757 | A * | 8/1996 | Whipple, III ................ 62/225 |
| 5,586,441 | A | 12/1996 | Wilson et al. |

| | | | |
|---|---|---|---|
| 5,597,117 A | 1/1997 | Watanabe et al. | |
| 5,598,715 A | 2/1997 | Edmisten | |
| 5,615,560 A | 4/1997 | Inoue | |
| 5,622,055 A | 4/1997 | Mei et al. | |
| 5,622,057 A | 4/1997 | Bussjager et al. | |
| 5,634,355 A | 6/1997 | Cheng et al. | |
| 5,642,858 A * | 7/1997 | Kakehashi et al. | 236/92 B |
| 5,651,258 A | 7/1997 | Harris | |
| 5,678,417 A | 10/1997 | Nigo et al. | |
| 5,689,962 A | 11/1997 | Rafalovich | |
| 5,692,387 A | 12/1997 | Alsenz et al. | |
| 5,694,782 A | 12/1997 | Alsenz | |
| 5,706,665 A | 1/1998 | Gregory | |
| 5,706,666 A | 1/1998 | Yamanaka et al. | |
| 5,743,100 A | 4/1998 | Welguisz et al. | |
| 5,752,390 A | 5/1998 | Hyde | |
| 5,765,391 A | 6/1998 | Lee et al. | |
| 5,806,321 A | 9/1998 | Bendtsen et al. | |
| 5,813,242 A | 9/1998 | Lawrence et al. | |
| 5,826,438 A | 10/1998 | Ohishi et al. | |
| 5,839,505 A | 11/1998 | Ludwig et al. | |
| 5,842,352 A | 12/1998 | Gregory | |
| 5,845,511 A | 12/1998 | Okada et al. | |
| 5,850,968 A | 12/1998 | Jokinen | |
| 5,862,676 A | 1/1999 | Kim et al. | |
| 5,867,998 A | 2/1999 | Guertin | |
| 5,887,651 A | 3/1999 | Meyer | |
| 5,964,099 A | 10/1999 | Kim | |
| 5,987,916 A | 11/1999 | Egbert | |
| 6,092,733 A * | 7/2000 | Watanabe et al. | 236/92 B |
| 6,220,566 B1 | 4/2001 | Miller | |
| 6,241,157 B1 * | 6/2001 | Yano et al. | 236/92 B |
| 6,318,118 B2 | 11/2001 | Hanson et al. | |
| 6,430,950 B1 | 8/2002 | Dienhart et al. | |
| 2003/0121274 A1 | 7/2003 | Wightman | |

FOREIGN PATENT DOCUMENTS

| | | |
|---|---|---|
| EP | 0 355 180 A2 | 2/1990 |
| EP | 0355180 | 2/1990 |
| FR | 1517003 | 2/1968 |
| JP | 58146778 | 9/1983 |
| JP | 03020577 | 1/1991 |
| JP | 10325630 | 8/1998 |
| JP | 10306958 | 11/1998 |
| WO | WO 93/06422 | 4/1993 |
| WO | WO 95/03515 | 2/1995 |
| WO | WO 98/03827 | 1/1998 |
| WO | WO 98/57104 | 12/1998 |
| WO | WO 99/45447 | 9/1999 |
| WO | WO 02/23102 A1 | 3/2002 |

OTHER PUBLICATIONS

02979575; Tadashi et al.; Refrigerating Cycle; Nov. 7, 1989; Pub. No. 01–277175; p. 46.

04001275; Tomomi et al.; Air Conditioner; Dec. 18, 1992; Pub. No. 04–366375; p. 69.

Kominkiewicz, Frank, Memo, dated Feb. 17, 2000, Subject "Tecogen Chiller", 6 pages.

Vienna–Tyler Dec. Case, Memo, dated Feb. 25, 2000, Compressor Model D6VD12, Serial N159282.

Pending U.S. Appl. No. 09/228,696 filed entitled Vapor Compression System and Method, filed Jan. 12, 1999.

Pending U.S. Appl. No. 09/443,071 entitled Vapor Compression System and Method filed Nov. 18, 1999.

Pending International Application No. PCT/US00/00622 entitled Vapor Compression System and Method International Filing Date: Oct. 1, 2000.

Pending International Application No. PCT/US00/00663 entitled Vapor Compression System and Method International Filing Date: Jan. 11, 2000.

Pending International Application No. PCT/US00/14648 entitled Vpor Compression System and Method International Filing Date: May 26, 2000.

Pending U.S. Appl. No. 09/661,478 entitled Evaporator Coil with Multiple Orifices filed Sep. 14, 2000.

Pending U.S. Appl. No. 09/661,477 entitled Expansion Device For Vapor Compression System filed Sep. 14, 2000.

Pending U.S. Appl. No. 09/661,543 entitled Vapor Compression System filed Sep. 14, 2000.

Pending U.S. Appl. No. 09/731,311 Vapor Compression System And Method filed Dec. 6, 2000.

Noble Alloy Valve, "Ball Valve Repair Manual," Jan. 26, 2000.

* cited by examiner

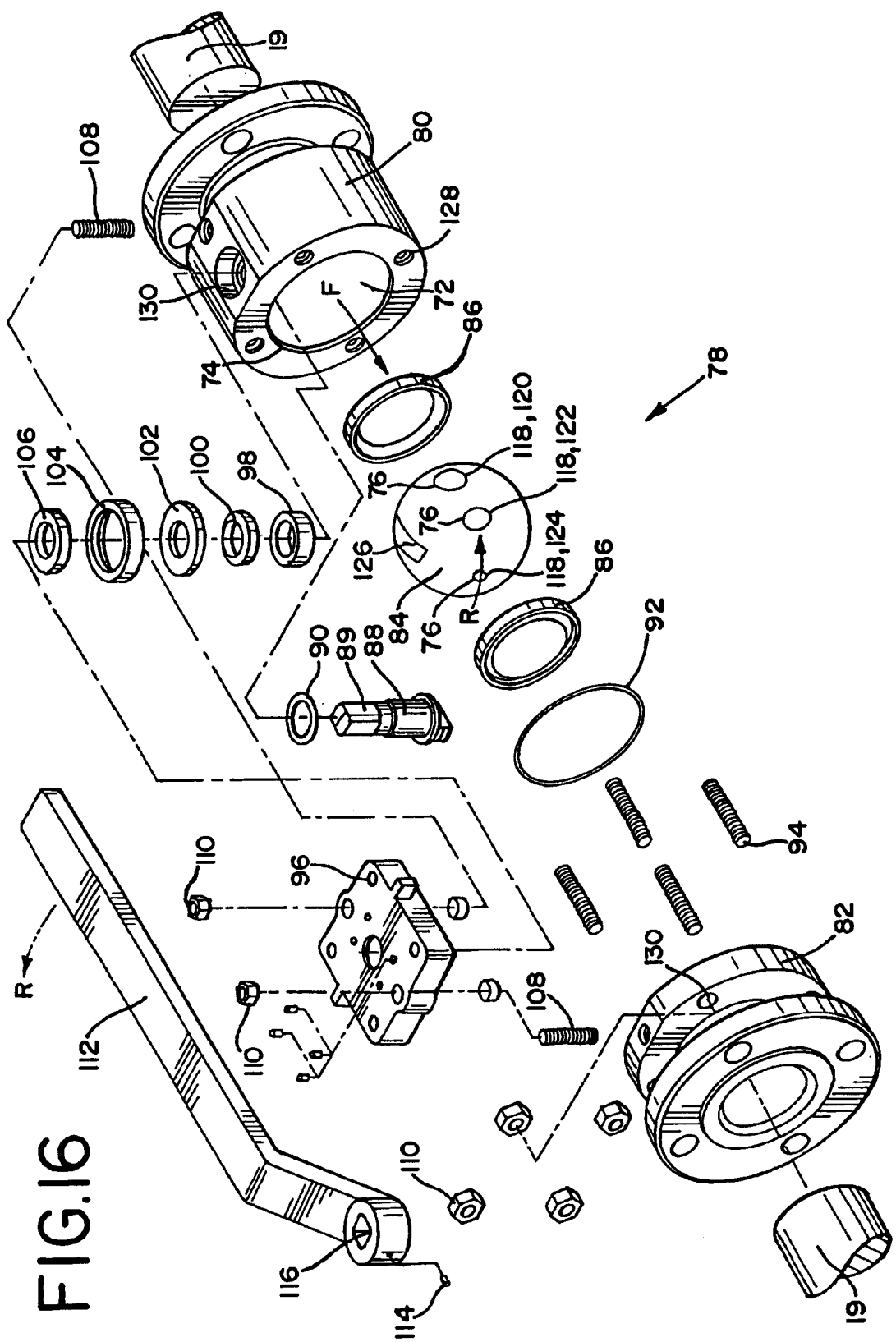

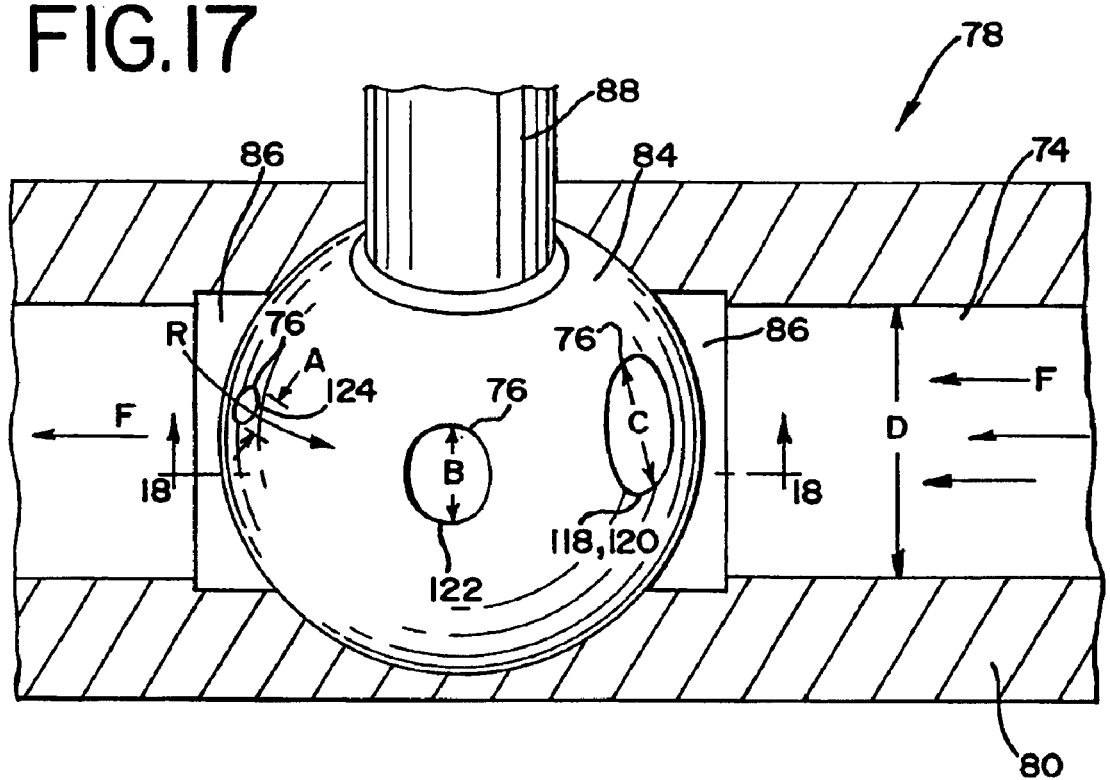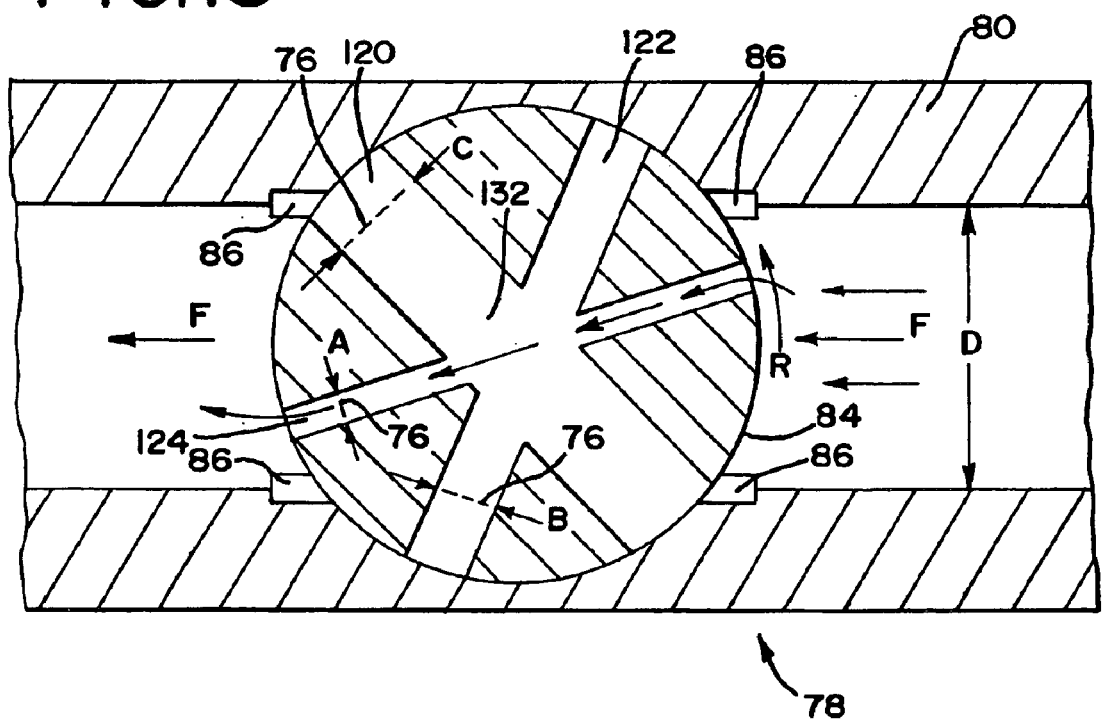

EXPANSION DEVICE FOR VAPOR COMPRESSION SYSTEM

RELATED APPLICATIONS

This application is a continuation-in-part of application Ser. No. 09/661,477, filed on Sep. 14, 2000, which is hereby incorporated by reference herein.

BACKGROUND

This invention relates, in general, to vapor compression systems, and more particularly, to an expansion device for a vapor compression system.

In a closed-loop vapor compression cycle, heat transfer fluid changes state from a vapor to a liquid in the condenser, giving off heat to ambient surroundings, and changes state from a liquid to a vapor in the evaporator, absorbing heat from the ambient surroundings during vaporization. A typical vapor compression system includes a compressor for pumping heat transfer fluid, such as a freon, to a condenser, where heat is given off as the heat transfer fluid condenses into a liquid. The heat transfer fluid then flows through a liquid line to an expansion device, where the heat transfer fluid undergoes a volumetric expansion. The heat transfer fluid exiting the expansion device is usually a low quality liquid vapor mixture. As used herein, the term "low quality liquid vapor mixture" refers to a low pressure heat transfer fluid in a liquid state with a small presence of flash gas that cools off the remaining heat transfer fluid as the heat transfer fluid continues on in a sub-cooled state. The expanded heat transfer fluid then flows into an evaporator. The evaporator includes a coil having an inlet and an outlet, wherein the heat transfer fluid is vaporized at a low pressure absorbing heat while it undergoes a change of state from a liquid to a vapor. The heat transfer fluid, now in the vapor state, flows through the coil outlet and exits the evaporator. The heat transfer fluid then flows through a suction line and back to the compressor. A typical vapor compression system may include more than one expansion device. Moreover, the expansion device may be placed in various locations within a vapor compression system. For example, as the heat transfer fluid flows into an evaporator it may flow through a second expansion device, where the heat transfer fluid undergoes a second volumetric expansion. Additionally, a typical vapor compression system may include a nozzle or fixed orifice.

In one aspect, the efficiency of the vapor compression cycle depends upon the precise control of the volumetric expansion of a heat transfer fluid in various locations within a vapor compression system. Heat transfer fluid is volumetrically expanded when the heat transfer fluid flows through an expansion device, such as a thermostatic expansion valve, a capillary tube, and a pressure control, or when the heat transfer fluid flows through a nozzle or fixed orifice. Oftentimes, the rate at which a heat transfer fluid is volumetrically expanded needs to be varied depending on the conditions within the vapor compression system. Devices such as capillary tubes, pressure controls, nozzles, or fixed orifices are fixed in size and cannot vary the rate at which a heat transfer fluid is volumetrically expanded. While many thermostatic expansion valves can vary the rate at which a heat transfer fluid is volumetrically expanded, they are complex and rather costly to manufacture. Moreover, thermostatic expansion valves are not as precise as capillary tubes, pressure controls, nozzles, or fixed orifices when it comes to controlling the rate at which heat transfer fluid is volumetrically expanded.

Accordingly, further development of vapor compression systems, and more specifically, expansion devices for vapor compression systems, is necessary in order to decrease the complexity and cost, and increase the precision of expansion devices that can vary the rate in which a heat transfer fluid is volumetrically expanded.

SUMMARY

According to one aspect of the present invention, a vapor compression system is provided. The vapor compression system has a line for flowing heat transfer fluid. A compressor is connected with the line for increasing the pressure and temperature of the heat transfer fluid and a condenser is connected with the line for liquefying the heat transfer fluid. The vapor compression system also has an expansion device connected with the line for expanding the heat transfer fluid. The expansion device has a housing defining a housing orifice and at least one ball within the housing. The ball forms at least two channels, wherein each channel defines a channel orifice. The effective cross-sectional area of the one channel orifice is greater than the effective cross-sectional area of the other channel orifice. Moreover, the ball is movable between a first position and a second position, wherein the housing orifice is effectively made larger in the first position than in the second position. The vapor compression system also has an evaporator connected with the line for transferring heat from ambient surroundings to the heat transfer fluid.

According to another aspect of the present invention, an expansion device for a vapor compression system is provided. The expansion device has a housing defining a housing orifice. The expansion device also has at least one ball within the housing. The ball forms at least two channels, wherein each channel defines a channel orifice. The effective cross-sectional area of the one channel orifice is greater than the effective cross-sectional area of the other channel orifice. Moreover, the ball is movable between a first position and a second position, wherein the housing orifice is effectively made larger in the first position than in the second position.

BRIEF DESCRIPTION OF THE DRAWINGS

FIG. 16 is an exploded perspective view of an expansion device, in accordance with one embodiment of the invention;

FIG. 17 is an enlarged, partial, cross-sectional view of the expansion device in FIG. 16, in accordance with one embodiment of the invention;

FIG. 18 is a cross-sectional view of the expansion device in FIG. 17 taken along line 18, in accordance with one embodiment of the invention;

Figure 1:
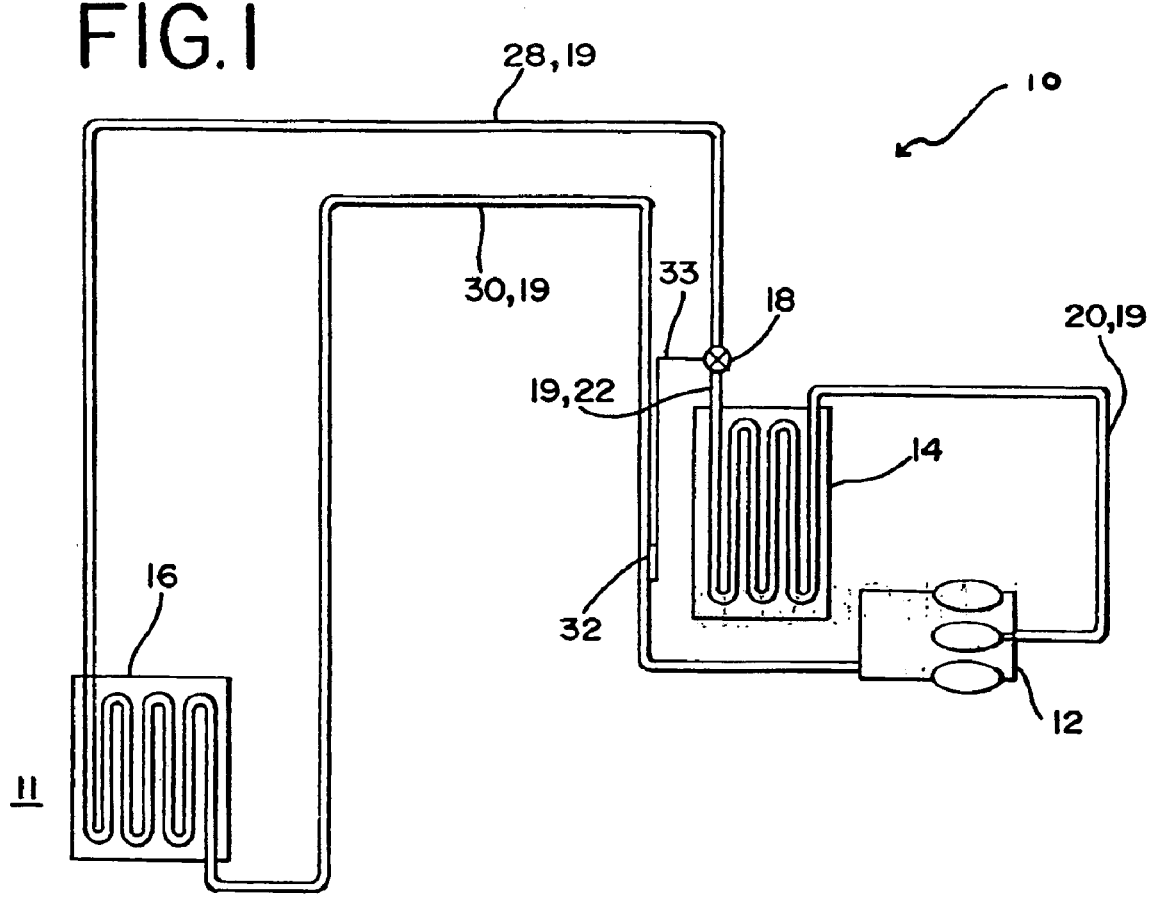
FIG. 1 is a schematic drawing of a vapor compression system arranged in accordance with one embodiment of the invention.

For simplicity and clarity of illustration, elements shown in the Figures have not necessarily been drawn to scale. For example, dimensions of some elements are exaggerated relative to each other. Further, when considered appropriate, reference numerals have been repeated among the Figures to indicate corresponding elements.

DETAILED DESCRIPTION OF THE PRESENTLY PREFERRED EMBODIMENTS

One embodiment of a vapor compression system 10 is illustrated in FIG. 1. Vapor compression system 10 includes a compressor 12 for increasing the pressure and temperature of a heat transfer fluid 34, a condenser 14 for liquefying the heat transfer fluid 34, an evaporator 16 for transferring heat from ambient surroundings to the heat transfer fluid 34, an expansion device 18 for expanding the heat transfer fluid 34, and a line 19 for flowing the heat transfer fluid. Line 19 allows for the flow of a heat transfer fluid 34 from one component of vapor compression system 10, such as compressor 12, condenser 14, evaporator 16, and expansion device 18, to another component of vapor compression system 10. Compressor 12, condenser 14, evaporator 16, and expansion device 18 are all connected with line 19. In one embodiment, line 19 includes discharge line 20, liquid line 22, saturated vapor line 28, and suction line 30, as illustrated in FIG. 1. In this embodiment, compressor 12 is connected with condenser 14 through discharge line 20, condenser 14 is connected with expansion device 18 through liquid line 22, expansion device 18 is connected with evaporator 16 through saturated vapor line 28, and evaporator 16 is connected with compressor 12 through suction line 30, as illustrated in FIG. 1.

In one embodiment, vapor compression system 10 includes a sensor 32 operably connected to expansion device 18. Sensor 32 can be used to vary the rate in which a heat transfer fluid 34 is volumetrically expanded through expansion device 18. Preferably, sensor 32 is mounted to a portion of line 19, such as suction line 30, and is operably connected to expansion device 18. Sensor 32 can be any type of sensor known by those skilled in the art designed to detect conditions in and around vapor compression system 10, such as the temperature, pressure, enthalpy, and moisture of heat transfer fluid 34 or any other type of conditions that may be monitored in and around vapor compression system 10. For example, sensor 32 may be a pressure sensor that detect the pressure of heat transfer fluid 34 at a certain point within vapor compression system 10, or sensor 32 may be a temperature sensor which detects the temperature of ambient surroundings 11 around vapor compression system 10. Preferably, sensor 32 is operably connected to expansion device 18 through control line 33.

Vapor compression system 10 can utilize essentially any commercially available heat transfer fluid 34 including refrigerants such as, for example, chlorofluorocarbons such as R-12 which is a dichlorodifluoromethane, R-22 which is a monochlorodifluoromethane, R-500 which is an azeotropic refrigerant consisting of R-12 and R-152a, R-503 which is an azeotropic refrigerant consisting of R-23 and R-13, and R-502 which is an azeotropic refrigerant consisting of R-22 and R-115. Vapor compression system 10 can also utilize heat transfer fluids 34 including, but not limited to, refrigerants R-13, R-113, 141b, 123a, 123, R-114, and R-11. Additionally, vapor compression system 10 can utilize heat transfer fluids 34 including hydrochlorofluorocarbons such as 141b, 123a, 123, and 124; hydrofluorocarbons such as R-134a, 134, 152, 143a, 125, 32, 23; azeotropic HFCs such as AZ-20 and AZ-50 (which is commonly known as R-507); and blended refrigerants such as MP-39, HP-80, FC-14, R-717, and HP-62 (commonly known as R-404a). Accordingly, it should be appreciated that the particular heat transfer fluid 34 or combination of heat transfer fluids 34 utilized in the present invention is not deemed to be critical to the operation of the present invention since this invention is expected to operate with a greater system efficiency with virtually all heat transfer fluids 34 than is achievable by any previously known vapor compression system utilizing the same heat transfer fluid 34.

In one embodiment, compressor 12 compresses heat transfer fluid 34, to a relatively high pressure and temperature. The temperature and pressure to which heat transfer fluid 34 is compressed by compressor 12 will depend upon the particular size of vapor compression system 10 and the cooling load requirements of vapor compression system 10. Compressor 12 then pumps heat transfer fluid 34 into discharge line 20 and into condenser 14. In condenser 14, a medium such as air, water, or a secondary refrigerant is blown past coils within condenser 14 causing the pressurized heat transfer fluid 34 to change to a liquid state. The temperature of the heat transfer fluid 34 drops as the latent heat within the heat transfer fluids 34 is expelled during the condensation process. Condenser 14 discharges the liquefied heat transfer fluid 34 to liquid line 22.

As shown in FIG. 1, liquid line 22 discharges the heat transfer fluid 34 into expansion device 18 whereupon the heat transfer fluid 34 undergoes a volumetric expansion. In one embodiment, the heat transfer fluid discharged by condenser 14 enters expansion device 18 and undergoes a volumetric expansion at a rate determined by the conditions of suction line 30, such as temperature and pressure, at sensor 32. Sensor 32 relays information about the conditions of suction line 30, such as pressure and temperature, through control line 33 to expansion device 18. Upon undergoing a volumetric expansion, the heat transfer fluid 34 is discharged from expansion device 18 as a saturated vapor into saturated vapor line 28. Saturated vapor line 28 connects the expansion device 18 with the evaporator 16. Evaporator 16 transfers heat from ambient surroundings 11 to the heat transfer fluid 34. Ambient surroundings 11 is the atmosphere surrounding vapor compression system 10, as illustrated in FIG. 1. Upon exiting evaporator 16, heat transfer fluid then travels through suction line 30 back to compressor 12.

While in the above embodiment expansion device 18 is connected with saturated vapor line 28 and liquid line 22, expansion device 18 may be connected with any component within vapor compression system 10 and, moreover, expansion device 18 may be located at any point within vapor compression system 10. Preferably, expansion device 18 is located at a point within vapor compression system 10 in which it is desired to volumetrically expand heat transfer fluid 34, such as between condenser 14 and evaporator 16. More preferably, expansion device 18 is located at a point within vapor compression system 10 in which it is desired to vary the rate at which a heat transfer fluid 34 is volumetrically expanded, such as between condenser 14 and evaporator 16, as illustrated in FIG. 1. Expansion device 18 may be used in place of or in combination with metering devices such as, but not limited to, a thermostatic expansion valve, a capillary tube, a pressure control, a nozzle, and a fixed orifice. Preferably, heat transfer fluid 34 is volumetrically expanded when the heat transfer fluid 34 flows through expansion device 18.

Figure 2:
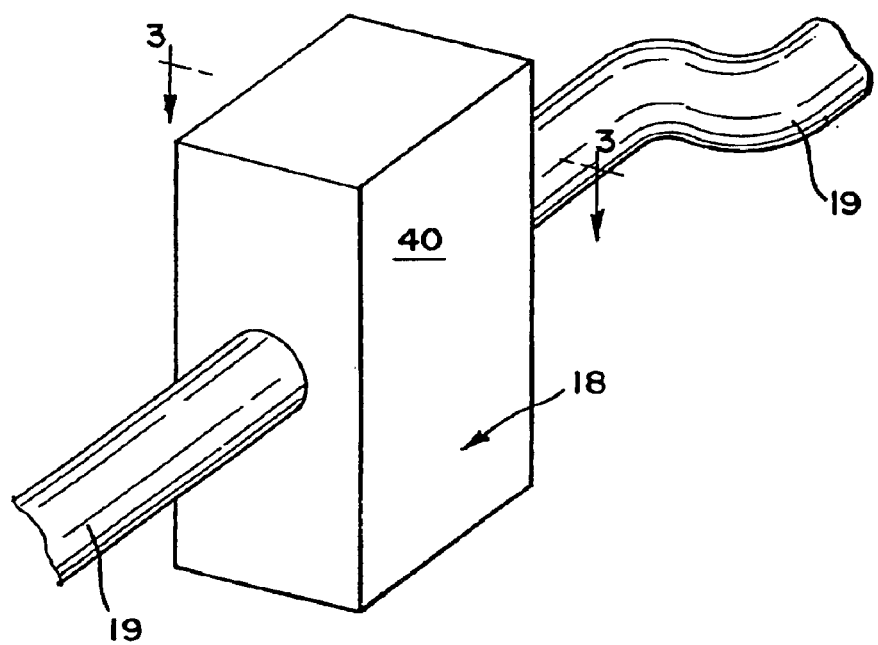
FIG. 2 is a perspective view of an expansion device connected with a line, in accordance with one embodiment of the invention.
Figure 3:
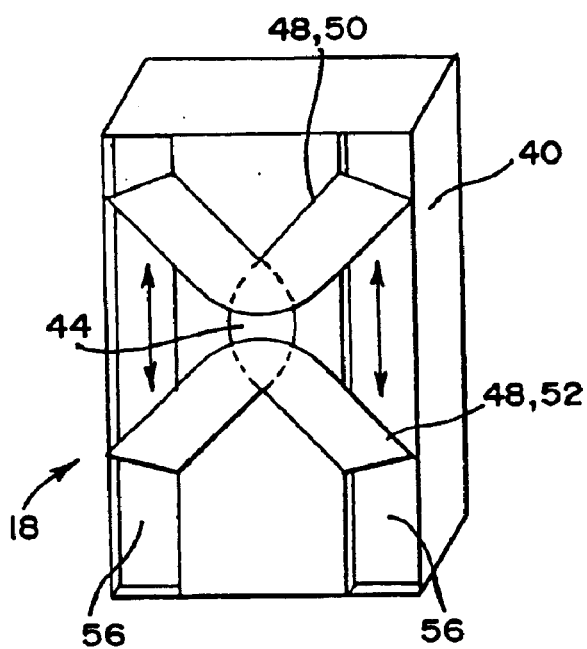
FIG. 3 is a cross-sectional perspective view of the expansion device in FIG. 2, wherein the expansion device is in a partially open position.
Figure 4:
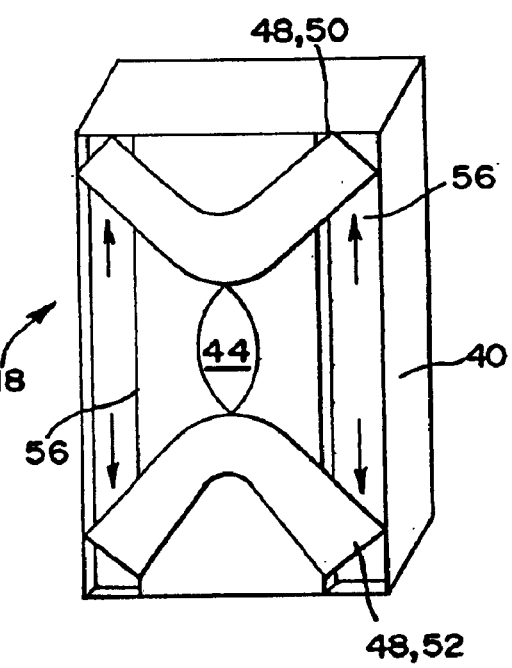
FIG. 4 is a cross-sectional perspective view of the expansion device in FIG. 2, wherein the expansion device is in a fully open position.
Figure 5:
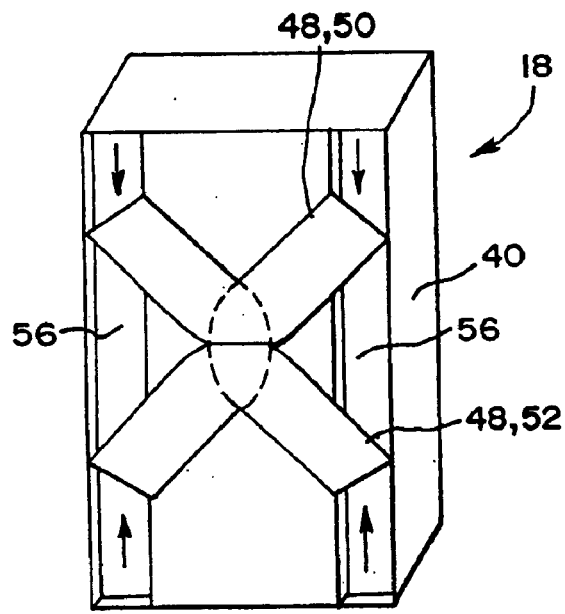
FIG. 5 is a cross-sectional perspective view of the expansion device in FIG. 2, wherein the expansion device is in a fully closed position.
Figure 6:
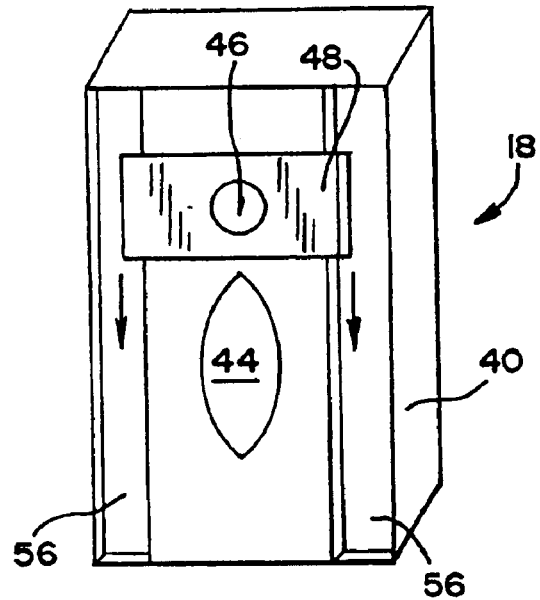
FIG. 6 is a cross-sectional perspective view of an expansion device, in accordance with one embodiment of the invention.
Figure 7:
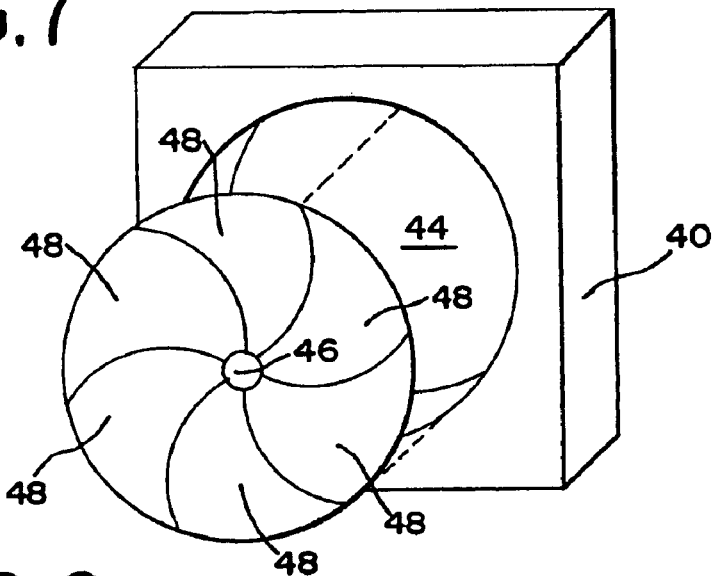
FIG. 7 is a cross-sectional exploded perspective view of an expansion device, wherein the expansion device is in a closed position, in accordance with one embodiment of the invention.
Figure 8:
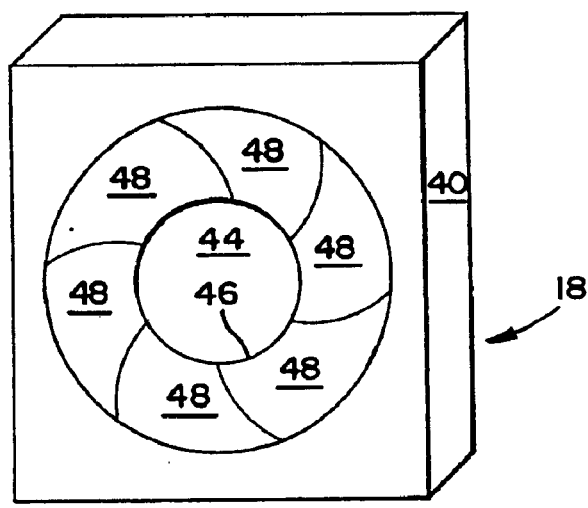
FIG. 8 is a cross-sectional perspective view of the expansion device in FIG. 7, wherein the expansion device is in a partially open position.
Figure 9:
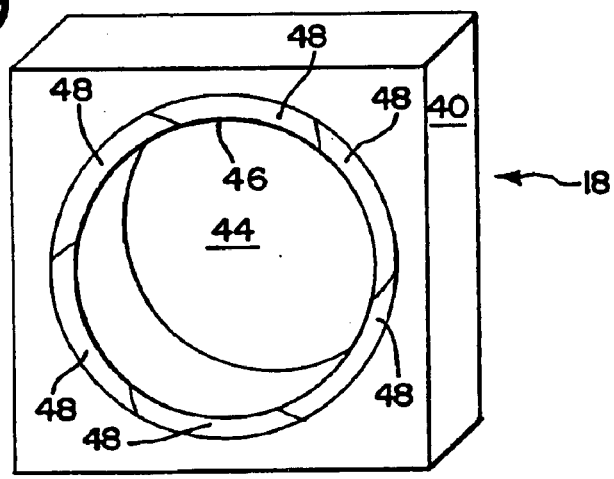
FIG. 9 is a cross-sectional perspective view of the expansion device in FIG. 7, wherein the expansion device is in a fully open position.

Shown in FIG. 2 is a perspective view of expansion device 18 connected with line 19, in accordance with one embodiment. Expansion device 18 includes a housing 40 and at least one blade 48, as illustrated in FIGS. 3–8. Housing 40 defines a first orifice 44. Preferably, housing 40 is manufactured from and includes a rigid, steel material, however housing 40 can be manufactured from any material known by those skilled in the art, such as ceramics, carbon fiber, any metal or metallic alloy, any plastic, or any other material. As defined herein, an orifice, such as first orifice 44, is any opening in which fluid, such as heat transfer fluid 34, can pass through. An orifice may have one of many shapes, such as a circular shape (as illustrated in FIGS. 7–9), a tear dropped shape, an eye shape (as illustrated in FIGS. 3–6), a square or rectangular shape, or any irregular shape. Blade 48 is connected with housing 40. Preferably, blade 48 is connected to housing 40, as illustrated in FIGS. 3–8. In one embodiment, blade 48 is connected to at least one track 56 within housing 40, wherein track 56 defines a path upon which blade 48 travels. Blade 48 may have one of many shapes, such as a circular shape or disc shape, a V shape (as illustrated in FIGS. 3–5), a curved shape (as illustrated in FIGS. 7–9), a square or rectangular shape (as illustrated in FIG. 6), or any irregular shape. Blade 48 includes and is manufactured from any material known by those skilled in the art, such as ceramics, carbon fiber, any metal or metallic alloy, any plastic, or any other material. Preferably, blade 48 includes and is manufactured from spring steel.

Blade 48 is movable between a first position, as illustrated in FIG. 4, and a second position, as illustrated in FIGS. 3 and 5, wherein the first orifice 44 is larger in the first position than in the second position. Blade 48 can be either manually moved from a first position to a second position or automatically moved, by means of a motor or other means, from a first position to a second position. As defined herein, an orifice, such as orifice 44, is made larger when the cross-sectional area of the orifice is effectively increased and an orifice is made smaller when the cross-sectional area of the orifice is effectively decreased, as illustrated in FIGS. 3–5. By increasing or decreasing the cross-sectional areas of an orifice, such as orifice 44, the rate of volumetric expansion within a heat transfer fluid 34 can be controlled and varied. Preferably, blade 48 overlaps at least a portion of the first orifice when blade 48 is in the second position, thereby making the first orifice smaller.

In one embodiment, expansion device 18 includes a first blade 50 and a second blade 52, as illustrated in FIGS. 3–5. Preferably, first and second blades 50, 52 are connected to housing 40, as illustrated in FIGS. 3–8. In one embodiment, first and second blades 50, 52 are connected to at least one track 56 within housing 40, wherein track 56 defines a path upon which first and second blades 50, 52 travel. First blade 50 and second blade 52 are movable between a first position and a second position, wherein the first orifice 44 is larger in the first position than in the second position, as illustrated in FIGS. 3–5.

In one embodiment, expansion device 18 includes a single blade 48, wherein single blade 48 defines a second orifice 46, as illustrated in FIG. 6. Preferably, second orifice 46 is adjacent first orifice 44. Blade 48 is movable between a first position and a second position, wherein the first orifice is larger in the first position than in the second position. By moving blade 48 between a first and second position, second orifice 46 overlaps with portions of first orifice 44, and first orifice 44 can be made larger or smaller.

In one embodiment expansion device 18 includes a series of blades 48, wherein the series of blades 48 define a second orifice 46, as illustrated in FIGS. 7–9. Second orifice 46 overlaps first orifice 44. Preferably, second orifice 46 is adjacent first orifice 44. Blades 48 are movable between a first position and a second position, wherein the second orifice 46 is larger in the first position than in the second position. By moving blades 48 between a first and second position, second orifice 46 can be made larger or smaller. Since second orifice 46 overlaps first orifice 44, first orifice 44 can be made larger or smaller as second orifice 46 is made larger or smaller. In one embodiment, the series of blades 48 define a second orifice 46 that is generally circular, as illustrated in FIGS. 7–9. In this embodiment, the series of blades 48 are arranged in a formation that resembles the aperture of a camera lens.

In one embodiment, sensor 32 controls the movement of at least one blade 48 between a first position a second position. Preferably, sensor 32 is connected with a moving device (not shown), such as an electric motor or an electromagnet, wherein the moving device can be used to automatically move blade 48 from a first position to a second position upon receiving a signal from sensor 32.

Figure 10:
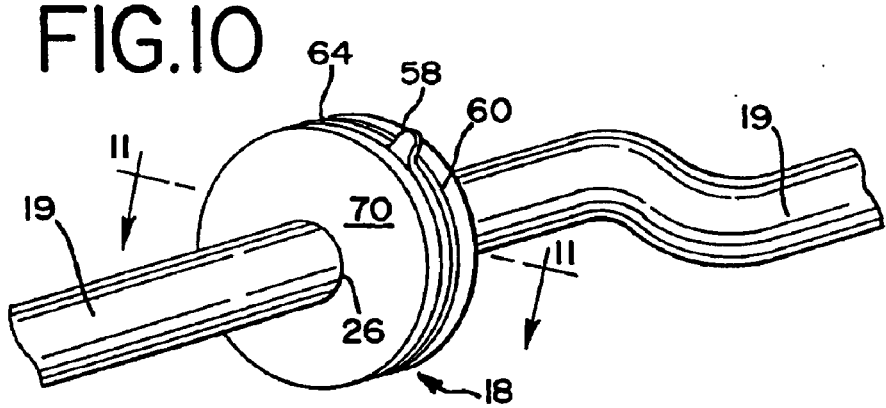
FIG. 10 is a perspective view of an expansion device connected with a line, in accordance with one embodiment of the invention.
Figure 11:
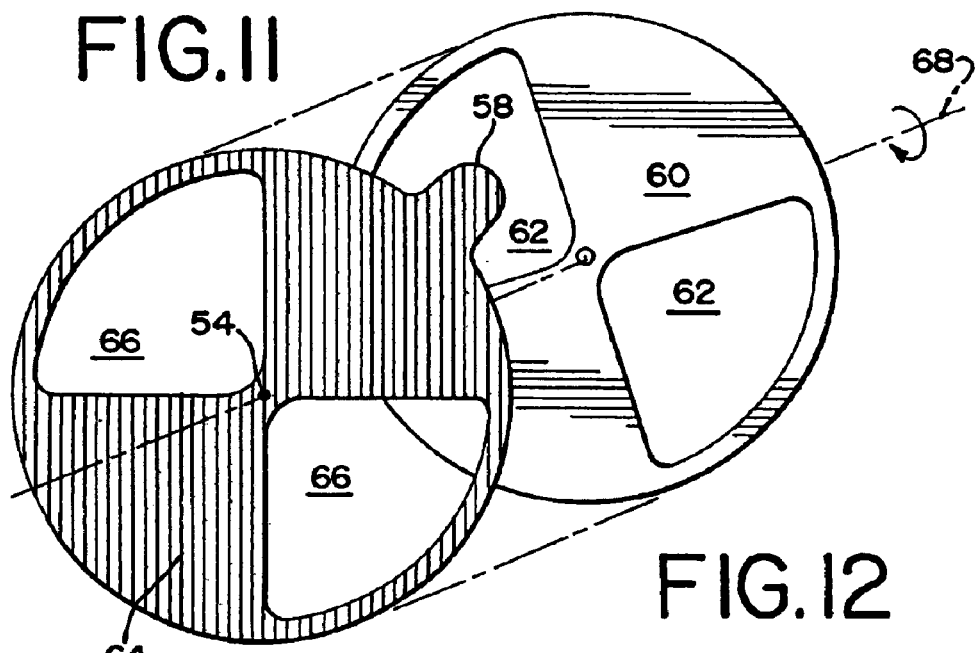
FIG. 11 is an exploded perspective view of the expansion device in FIG. 10.
Figure 12:
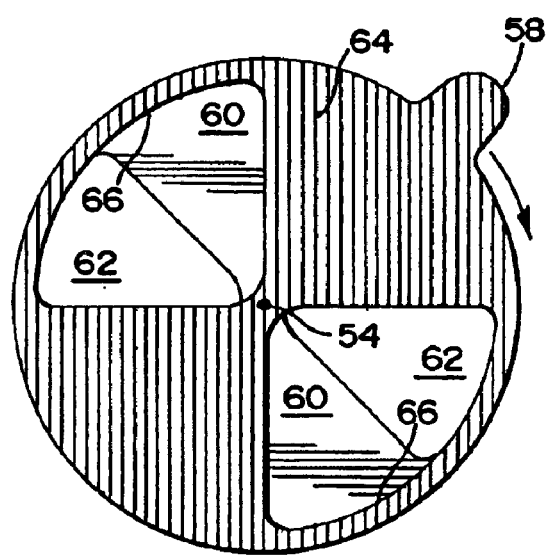
FIG. 12 is a cross-sectional view of the expansion device in FIG. 10, wherein the expansion device is in a partially open position.
Figure 13:
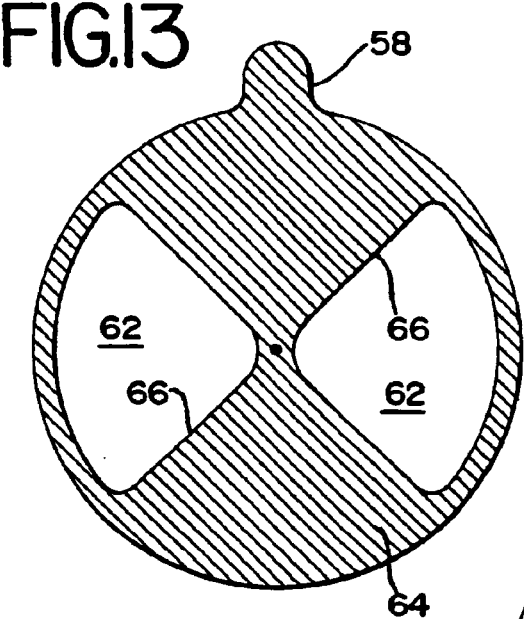
FIG. 13 is a cross-sectional view of the expansion device in FIG. 10, wherein the expansion device is in a fully open position.
Figure 14:
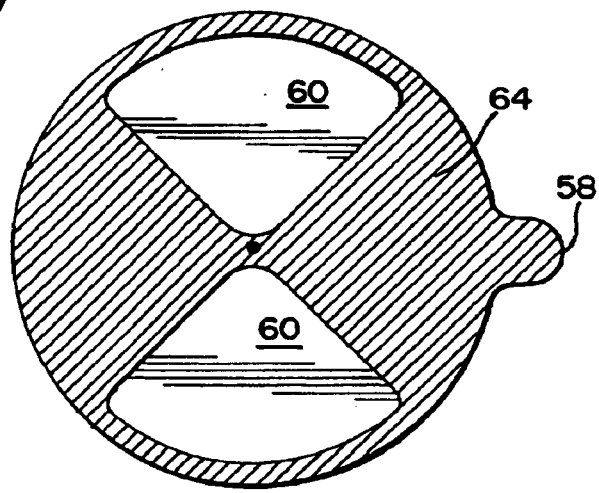
FIG. 14 is a cross-sectional view of the expansion device in FIG. 10, wherein the expansion device is in a fully closed position.

In one embodiment, expansion device 18 includes a first sheet 60 defining a first orifice 62, and a second sheet 64 overlapping the first sheet 60, as illustrated in FIGS. 10–15. First sheet 60 and second sheet 64 can be manufactured from and include any material known by those skilled in the art, such as ceramics, carbon fiber, any metal or metallic alloy, any plastic, or any other material. Preferably, first sheet 60 and second sheet 64 are manufactured from and include ceramic material. First sheet 60 and second sheet 64 may have one of many shapes, such as a circular shape or disc shape (as illustrated in FIGS. 10–15), a V shape, a curved shape, a square or rectangular shape, or any irregular shape. Second sheet 64 defines a second orifice 66, wherein the second orifice 66 is movable between a first position and a second position, and wherein the second orifice is larger in the first position than in the second position. In one embodiment, at least one of first sheet 60 and second sheet 64 rotate about a common axis 68, as illustrated in FIG. 11. Preferably, the common axis 68 is generally centered on first sheet 60 and second sheet 64. In one embodiment, first sheet 60 is fixed with respect to a housing 70, and second sheet 64 rotates about a common axis 68, wherein axis 68 is located at the center of bother first sheet 60 and second sheet 64, as illustrated in FIG. 10. Preferably, expansion device 18 includes a tab 58 protruding from housing 70 and connected with second sheet 64, wherein tab 58 allows for one to manually move second sheet 64 from a first position to a second position.

Preferably, heat transfer fluid 34 is used to lubricate either blades 48 or first and second sheets 60, 64, so that blades 48 and/or first and second sheets 60, 64 may move more freely about.

Figure 15:
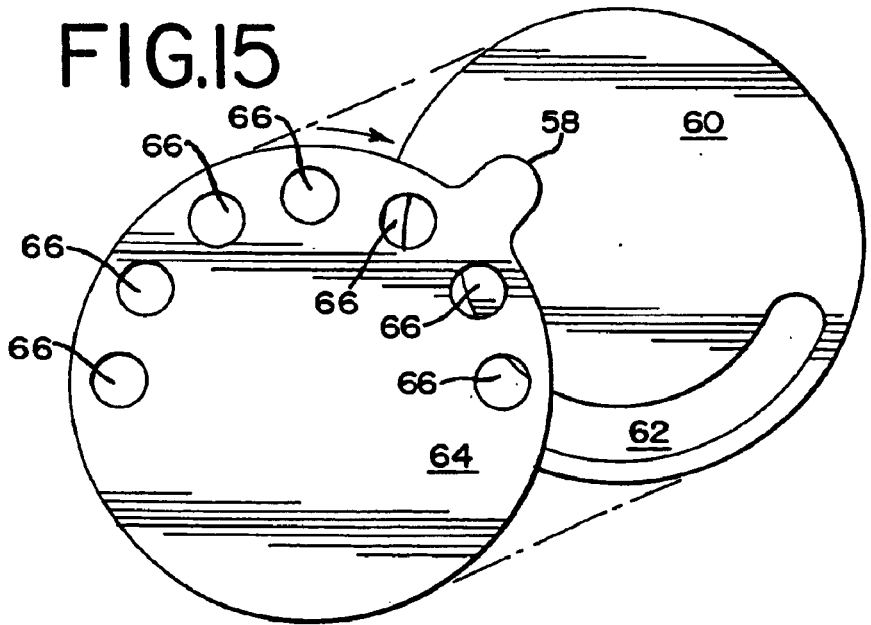
FIG. 15 is an exploded perspective view of an expansion device, in accordance with one embodiment of the invention.
Figure 19:
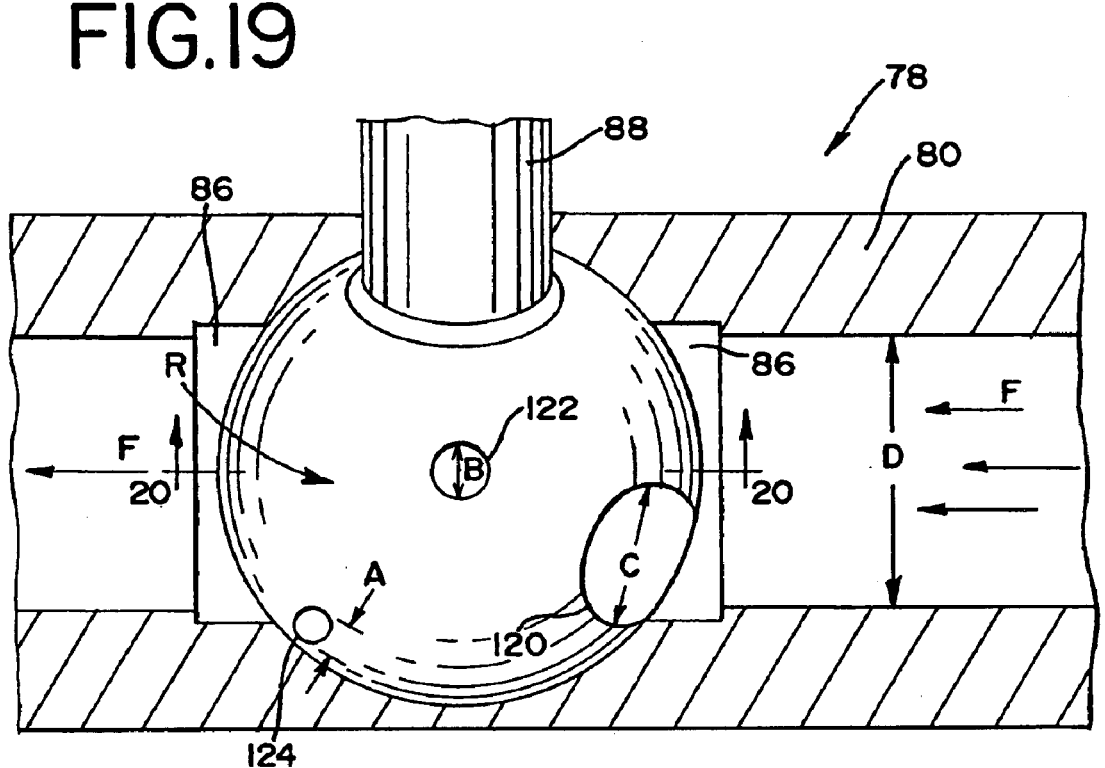
FIG. 19 is an enlarged, partial, cross-sectional view of an expansion device, in accordance with one embodiment of the invention.

In one embodiment, second sheet 64 defines multiple orifices 66 and first sheet 60 defines a single orifice 62, wherein the size and shape of orifice 62 allows orifice 62 to overlap multiple orifices 66, as illustrated in FIG. 15. Multiple orifices 66 are movable between a first position and a second position, wherein the single orifice overlaps the multiple orifices in the second position, and wherein the single orifice 62 is made larger as the multiple orifices move to the second position, as illustrated in FIG. 15.

Another embodiment of expansion device 18 is shown in FIGS. 16–20 and is generally designated by the reference numeral 78. This embodiment is functionally similar to that described in FIGS. 2–15 which was generally designated by the reference numeral 18. As shown in FIG. 16, expansion device 78 is connected with line 19. Expansion device 78 includes a housing 80 and at least one ball 84 located within housing 80, as illustrated in FIGS. 16–20. Housing 80 includes a bore 72 that defines a housing orifice 74 upon which heat transfer fluid enters housing 80. Preferably, housing 80 includes a rigid, steel material, however housing 80 can be manufactured from any rigid material known by those skilled in the art, such as ceramics, carbon fiber, any metal or metallic alloy, any plastic, or any other rigid material. Housing 80 is preferably constructed as a two-piece structure having a set of threaded bosses 128 that receive a set of housing studs 94, as shown in FIG. 16. Housing 80 is connected with a tailpiece 82 through a set of openings 130 within tailpiece 82 and a set of threaded nuts 110 which receive housing studs 94, as illustrated in FIG. 16. A housing seal 92 is sized to be sealingly received between housing 80 and tailpiece 82.

Ball 84 sits within bore 72 of housing 80 and is sandwiched between two seats 86 that are sized to be sealingly received in the bore 72 of the housing 80. While in this embodiment ball 84 is in the shape of a sphere, ball 84 can have other shapes, such as a cylinder, a parallelogram, and a pyramid. Ball 84 forms a notch 126 that receives an adjustment stem 88 through a second bore 130 of housing 80. A stem washer 90 surrounds the base of adjustment stem 88. The adjustment stem 88 receives a packing 98, a packing follower 100, a packing spring 102, a spring cap 104, and a thrust bearing 106 which overlie the washer 90 and are generally located within the bore 130. A base 96 holds the adjustment stem 88 within bore 130. A tip 89 of adjustment stem 88 pokes through an opening in the base 96. A handle 112 forms an opening 116 that is fitted over the tip 89. A handle set screw 114 secures the handle 112 to adjustment stem 88. As the handle 112 rotates in a rotational direction R, adjustment stem 88 and the ball 84 also rotate in a direction R, as illustrated in FIG. 16.

Figure 20:
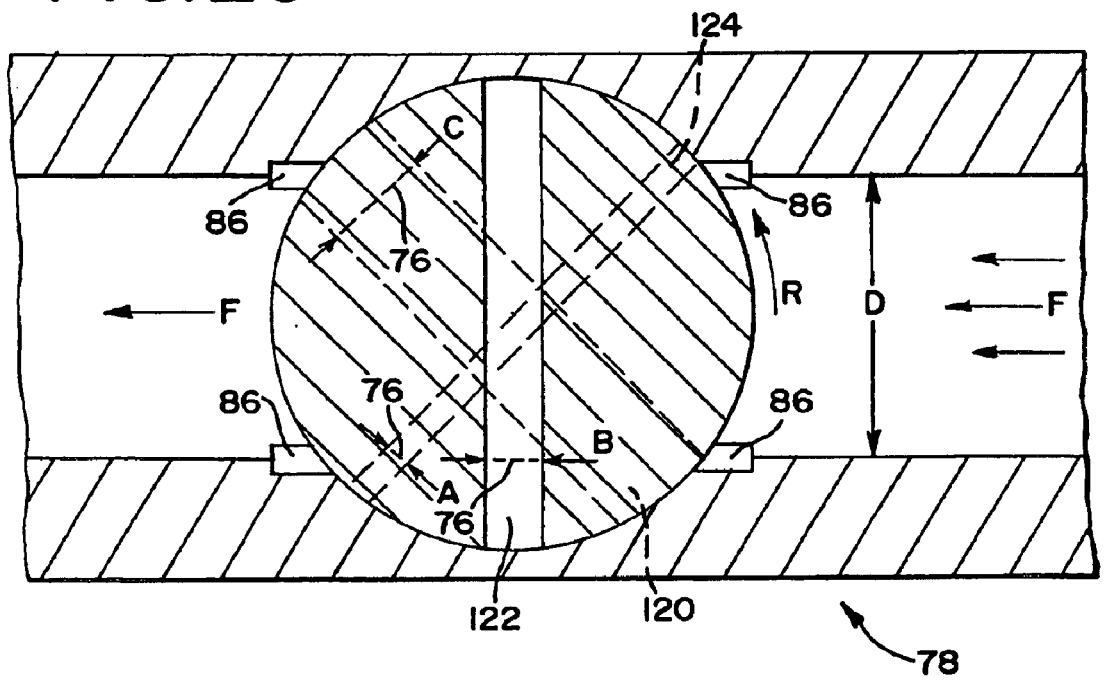
FIG. 20 is a cross-sectional view of the expansion device in FIG. 19 taken along line 20, in accordance with one embodiment of the invention.

As handle 112 rotates, ball 84 is movable between a first position and a second position. Ball 84 forms at least two channels 118 which each form a channel orifice 76, as illustrated in FIGS. 18 and 20–22. In one embodiment, each channel 118 goes all the way through ball 84, as illustrated in FIGS. 18 and 20. In one embodiment, first channel 120 goes through the ball 84, while second channel 122 only goes part way through the ball 84, and intersects with first channel 120 at a point within the ball 84, as illustrated in FIG. 22. The first channel 120 forms a first channel orifice 76 having effective cross-sectional area of C and the second channel 122 forms a second channel orifice 76 having an effective cross-sectional area of B, wherein the effective cross-sectional area C is not equal to the effective cross-sectional area B, as illustrated in FIGS. 18 and 20–22. As defined herein, the effective cross-sectional area is the cross-sectional area along a plane through the channel, wherein the plane is generally perpendicular to the direction F of the flow of heat transfer fluid 34 through that channel. Preferably, the effective cross-sectional area C is greater than the effective cross-sectional area B. More preferably, the effective cross-sectional area C is greater than the effective cross-sectional area B by at least 5%, and more preferably by at least 10%.

While a channel, such as first channel 120, may define a number of orifices along the developed length of that channel, as defined herein, the channel orifice 76, is the orifice defined by a channel that has the smallest cross-sectional area from any other orifice defined by that channel. For example, as illustrated in FIG. 22, the second channel 122 defines a first orifice 76 and a second orifice 77, wherein the first orifice 75 has an effective cross-sectional area of B and the second orifice 77 has an effective cross-sectional area of G, and wherein the effective cross-sectional area B is less than the effective cross-sectional area G, and the channel orifice 76 is the first orifice 75.

Figure 21:
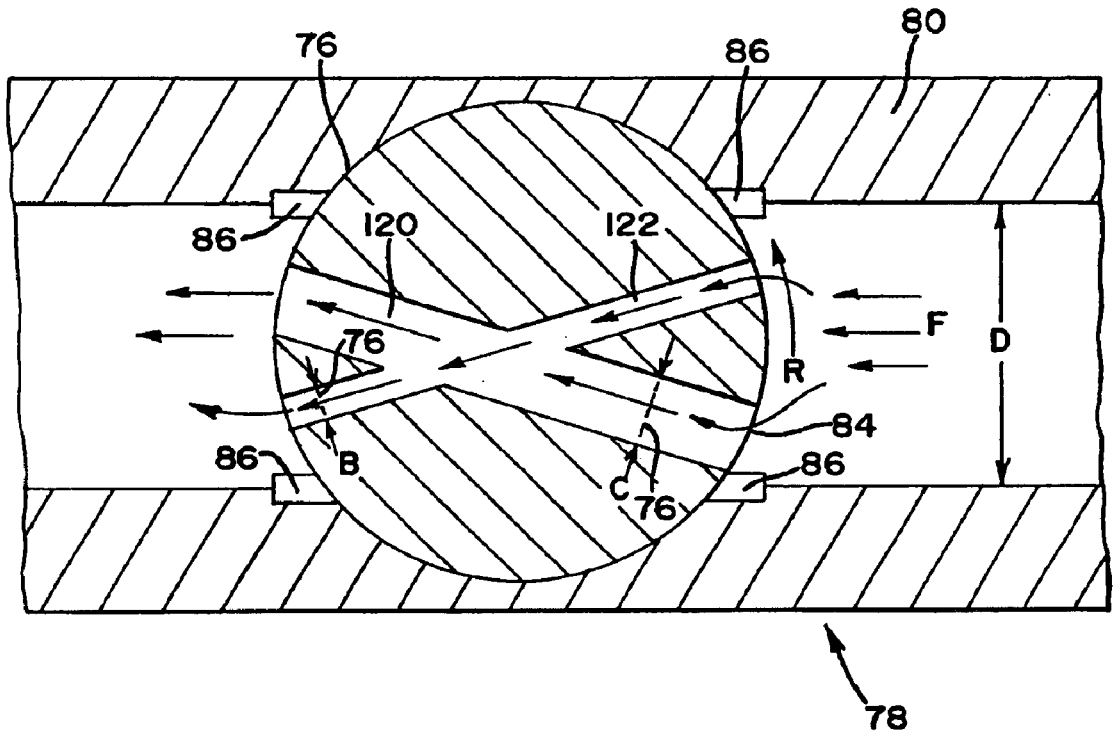
FIG. 21 is a cross-sectional view of the expansion device, in accordance with one embodiment of the invention.
Figure 22:
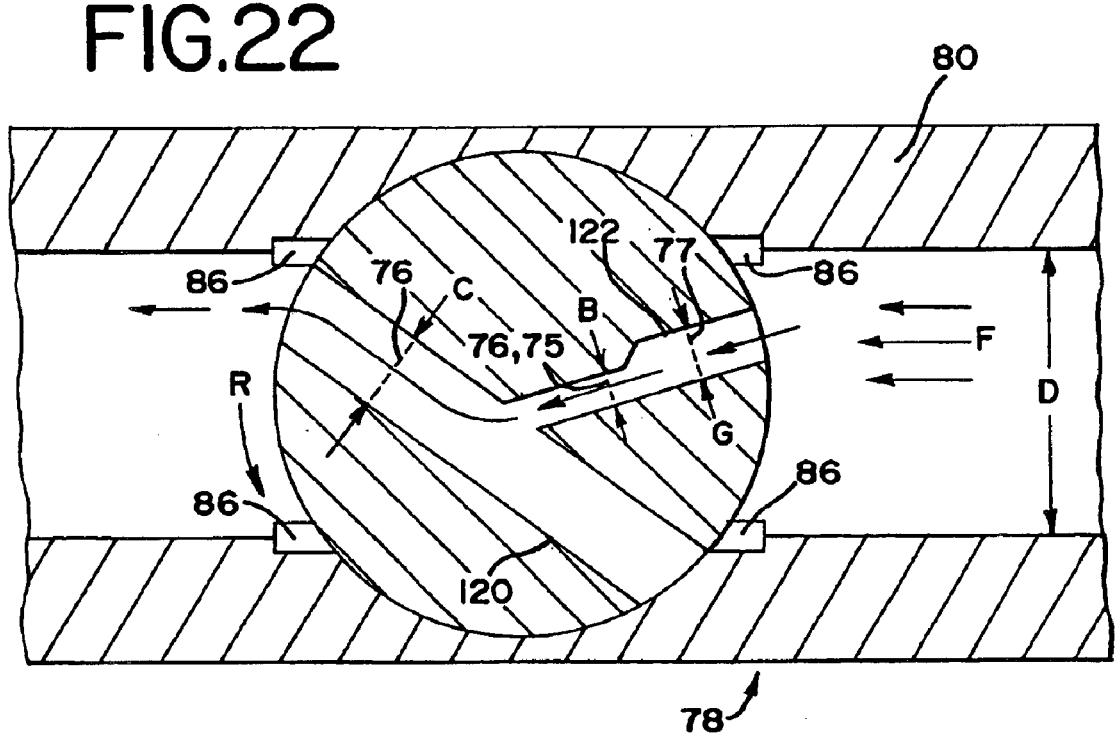
FIG. 22 is a cross-sectional view of the expansion device, in accordance with one embodiment of the invention.

The heat transfer fluid 34 flows in a direction F through line 19 and into the expansion device 78 through the housing orifice 74 having a diameter D, as illustrated in FIGS. 17–22. Heat transfer fluid 34 then flows through either the first channel 120 or the second channel 122, depending on the position of ball 84. For example, when the ball 84 is in a first position, the heat transfer fluid 34 may flow through the first channel 120, and when ball 84 is in a second position, the heat transfer fluid 34 may flows through the second channel 122. In one embodiment, when the ball 84 is in a first position, the heat transfer fluid 34 may flow through the first channel 120 and the second channel 122, as illustrated in FIG. 21 and FIG. 22.

As defined herein, an orifice, such as orifice 74, is made larger when the cross-sectional area of the orifice is effectively increased and an orifice is made smaller when the cross-sectional area of the orifice is effectively decreased. By moving the ball 84 from a first position to a second position, the cross-sectional area of housing orifice 74 can be effectively increased or decreased, thus the rate of volumetric expansion within a heat transfer fluid 34 which flows through the housing orifice 74, and through expansion device 78, can be precisely controlled and varied.

The ball 84 can be either manually moved from a first position to a second position or automatically moved, by means of a motor or other means, from a first position to a second position. In one embodiment, sensor 32 controls the movement of ball 84 between a first position a second position. Preferably, sensor 32 is connected with a moving device (not shown), such as an electric motor or an electromagnet, wherein the moving device can be used to automatically move ball 84 from a first position to a second position upon receiving a signal from sensor 32.

In one embodiment, the ball 84 forms a first channel 120 having an orifice 76 with an effective cross-sectional area C, a second channel 122 having an orifice 76 with an effective cross-sectional area B, and a third channel 124 having an orifice 76 with an effective cross-sectional area A, wherein the effective cross-sectional area A is not equal to effective cross-sectional areas C or B, and the effective cross-sectional area C is not equal to the effective cross-sectional area B, as illustrated in FIGS. 17–20.

In one embodiment, the first channel 120 and the second channel 122 form an intersection 132, wherein the path of the first channel 120 crosses the path of the second channel 122, as illustrated in FIGS. 18, 21 and 22. In one embodiment, the first channel 120 is located above or below the second channel 122 and therefore does not form an intersection with the second channel 122, as illustrated in FIG. 20.

In one embodiment, the first channel 120 and the second channel 122 are positioned near one another so that the heat transfer fluid 34 may flow through either the first channel 120, the second channel 122, or through both the first and the second channel 120,122, depending on the position of ball 84, as illustrated in FIG. 21. For example, when the ball 84 is in a first position, the heat transfer fluid 34 may flow through the first channel 120, and when ball 84 is in a second position, the heat transfer fluid 34 may flow through the second channel 122. However, when the ball 84 is in a third position, the heat transfer fluid may flow through both the first and the second channel. In this embodiment, the effective cross-sectional area C of the first channel and the effective cross-sectional area B of the second channel may be equal to each other.

Expansion device 18 may be combined with a traditional expansion device, wherein the traditional expansion device volumetrically expands heat transfer fluid 34 at a fixed rate. By combining expansion device 18 with a traditional expansion device, heat transfer fluid 34 can be volumetrically expanded at a varied rate, and thus simulate the effect of a thermostatic expansion valve, at a reduced cost.

Those skilled in the art will appreciate that numerous modifications can be made to enable vapor compression system 10 to address a variety of applications. For example, vapor compression system 10 operating in a retail food outlet may include a number of evaporators 16 that can be serviced by a common compressor 12. Also, in applications requiring refrigeration operations with high thermal loads, multiple compressors 12 can be used to increase the cooling capacity of the vapor compression system 10.

Those skilled in the art will recognize that vapor compression system 10 can be implemented in a variety of configurations. For example, the compressor 12, condenser 14, expansion device 18, and the evaporator 16 can all be housed in a single housing and placed in a walk-in cooler. In this application, the condenser 14 protrudes through the wall of the walk-in cooler and ambient air outside the cooler is used to condense the heat transfer fluid 34. In another application, vapor compression system 10 can be configured for air-conditioning a home or business. In yet another application, vapor compression system 10 can be used to chill water. In this application, the evaporator 16 is immersed in water to be chilled. Alternatively, water can be pumped through tubes that are meshed with the evaporator coil 44. In a further application, vapor compression system 10 can be cascaded together with another system for achieving extremely low refrigeration temperatures. For example, two vapor compression systems using different heat transfer fluids 34 can be coupled together such that the evaporator of a first system provides a low temperature ambient. A condenser of the second system is placed in the low temperature ambient and is used to condense the heat transfer fluid in the second system.

As known by one of ordinary skill in the art, every element of vapor compression system 10 described above, such as evaporator 16, liquid line 22, and suction line 30, can be scaled and sized to meet a variety of load requirements. In addition, the refrigerant charge of the heat transfer fluid in vapor compression system 10, may be equal to or greater than the refrigerant charge of a conventional system.

Thus, it is apparent that there has been provided, in accordance with the invention, a vapor compression system that fully provides the advantages set forth above. Although the invention has been described and illustrated with reference to specific illustrative embodiments thereof, it is not intended that the invention be limited to those illustrative embodiments. Those skilled in the art will recognize that variations and modifications can be made without departing from the spirit of the invention. For example, non-halogenated refrigerants can be used, such as ammonia, and the like can also be used. It is therefore intended to include within the invention all such variations and modifications that fall within the scope of the appended claims and equivalents thereof.

What is claimed is:

1. A vapor compression system comprising:
   a line for flowing heat transfer fluid;
   a compressor connected with the line for increasing the pressure and temperature of the heat transfer fluid;
   a condenser connected with the line for liquefying the heat transfer fluid;
   an expansion device connected with the line for expanding the heat transfer fluid, comprising:
      a housing defining a housing orifice;
      at least one ball within the housing, the ball forming at least two channels, wherein each channel defines a channel orifice, wherein the effective cross-sectional area of the one channel orifice is greater than the effective cross-sectional area of the other channel orifice, wherein the ball is movable between a first position and a second position, and wherein the housing orifice is effectively made larger in the first position than in the second position; and
   an evaporator connected with the line for transferring heat from ambient surroundings to the heat transfer fluid.

2. The vapor compression system of claim 1, wherein the ball forms a third channel, wherein the ball is movable between a second and third position, wherein the housing orifice is smaller in the third position than in the first position.

3. The vapor compression system of claim 1, wherein the first channel and the second channel form an intersection.

4. The vapor compression system of claim 1, wherein the first channel and the second channel do not form an intersection.

5. The vapor compression system of claim 1, wherein the channel orifice is generally circular.

6. The vapor compression system of claim 1, wherein the first channel and the second channel go all the way through the ball.

7. The vapor compression system of claim 1, wherein the first channel goes through the ball, and wherein the second channel only goes part way through the ball and intersects with the first channel at a point within the ball.

8. The vapor compression system of claim 1, further comprising a sensor connected with the expansion device.

9. The vapor compression system of claim 8, wherein the sensor controls the movement of the ball between the first position and the second position.

10. An expansion device for a vapor compression system, comprising:
   a housing defining a housing orifice; and
   at least one ball within the housing, the ball forming at least two channels, wherein each channel defines a channel orifice, wherein the effective cross-sectional area of the one channel orifice is greater than the effective cross-sectional area of the other channel orifice, wherein the ball is movable between a first position and a second position, and wherein the housing orifice is effectively made larger in the first position than in the second position.

11. The expansion device of claim 10, wherein the housing orifice is adapted to receive a heat transfer fluid.

12. The vapor compression system of claim 10, wherein the ball forms a third channel, wherein the ball is movable between a second and third position, and wherein the housing orifice is larger in the first position than in the second position.

13. The vapor compression system of claim 10, wherein the first channel and the second channel form an intersection.

14. The vapor compression system of claim 10, wherein the first channel and the second channel do not form an intersection.

15. The vapor compression system of claim 10, wherein the channel orifice is generally circular.

16. The vapor compression system of claim 8, further comprising a sensor connected with the expansion device.

17. A method for operating a vapor compression system comprising connecting the expansion device of claim 8 with a compressor, a condenser, and an evaporator through a line.

18. A device for controlling the flow of a fluid which passes through the device, comprising:
   a housing defining a housing orifice; and
   at least one ball within the housing, the ball forming at least two channels, wherein each channel defines a channel orifice, wherein the effective cross-sectional area of the one channel orifice is greater than the effective cross-sectional area of the other channel orifice, wherein the ball is movable between a first position and a second position, and wherein the housing orifice is effectively made larger in the first position than in the second position.

19. The device of claim 18, wherein the housing orifice is adapted to receive a heat transfer fluid.

20. The device of claim 18, wherein the ball forms a third channel, wherein the ball is movable between a second and third position, and wherein the housing orifice is larger in the first position than in the second position.

21. The device of claim 18, wherein the first channel and the second channel form an intersection.

22. The device of claim 18, wherein the first channel and the second channel do not form an intersection.

23. The device of claim 18, wherein the channel orifice is generally circular.

24. The device of claim 18, wherein the ball is connected with a handle, and wherein the ball is movable between a first position and a second position when the handle is rotated.

25. The device of claim 18, wherein the ball is movable to a third position, and wherein substantially no fluid passes through the device when in the third position.

26. A device for controlling flow of a fluid which passes through the device, comprising:
   a housing defining a first orifice, wherein the first orifice is adapted to receive a heat transfer fluid; and
   a first blade and a second blade connected with the housing, wherein the first blade and second blade are movable between a first position and a second position, and wherein the first orifice is larger in the first position than in the second position.

27. A device for controlling flow of a fluid which passes through the device, comprising:
   a housing defining a first orifice, wherein the first orifice is adapted to receive a heat transfer fluid; and
   a series of blades, wherein the blades define a second orifice adjacent the first orifice, wherein the blades are movable between a first position and a second position, and wherein the second orifice is larger in the first position than in the second position.

28. The device of claim 27, wherein the second orifice is generally circular.

29. A device for controlling the flow of a fluid which passes through the device, comprising:
   a first sheet defining a first orifice;
   a second sheet overlapping the first sheet, the second sheet defining a second orifice, wherein the second orifice is movable between a first position and a second position, and wherein the second orifice is larger in the first position than in the second position.

30. The device of claim 29, wherein the first sheet and second sheet are generally disc-shaped.

31. The device of claim 29, wherein the first sheet and second sheet rotate about a common axis.

32. The device of claim 29, wherein the first sheet and the second sheet comprise ceramic material.

33. The device of claim 29, further comprising heat transfer fluid located between the first sheet and the second sheet for lubricating the first sheet and the second sheet.

34. The device of claim 29, wherein the second sheet defines multiple orifices.

35. The device of claim 29, further comprising a housing surrounding the first and second sheets.

36. The device of claim 29, wherein the first sheet is connected with the second sheet through a pin.

37. The device of claim 29, wherein the second orifice is movable to a third position, and wherein substantially no fluid passes through the device when in the third position.

* * * * *